United States Patent [19]

Hirai et al.

[11] Patent Number: 4,460,384

[45] Date of Patent: Jul. 17, 1984

[54] PROCESS FOR SEPARATING CARBON MONOXIDE FROM A GAS MIXTURE

[75] Inventors: Hidefumi Hirai; Makoto Komiyama; Susumu Hara, all of Tokyo, Japan

[73] Assignee: Nippon Steel Corporation, Tokyo, Japan

[21] Appl. No.: 373,241

[22] Filed: Apr. 29, 1982

[30] Foreign Application Priority Data

Apr. 30, 1981 [JP]  Japan .................................. 56-65444
Aug. 4, 1981 [JP]  Japan .................................. 56-122215
Dec. 4, 1981 [JP]  Japan .................................. 56-195219
Feb. 1, 1982 [JP]  Japan .................................. 57-14588

[51] Int. Cl.³ .............................................. B01D 19/00
[52] U.S. Cl. ...................................... 55/36; 55/68; 423/246; 252/184
[58] Field of Search .................. 55/68, 36; 423/246; 252/184

[56] References Cited

U.S. PATENT DOCUMENTS 4,102,802  7/1978  Johnson et al. .......................... 55/68
4,347,066  8/1982  Doyle ...................................... 55/68

FOREIGN PATENT DOCUMENTS 1318790  5/1973  United Kingdom ................ 423/246

Primary Examiner—Bernard Nozick
Attorney, Agent, or Firm—Cushman, Darby & Cushman

[57] ABSTRACT

A process for separating carbon monoxide from a gas mixture is presented. In this process carbon monoxide contained in the gas mixture containing carbon monoxide and up to approximately 40,000 ppm of water can be effectively separated by contacting the gas mixture with an absorbing solution containing (a) at least one copper(I) halide, (b) at least one aluminum(III) halide and (c) at least one compound having at least two benzene nuclei in one molecule thereof. The component (c) is selected from the group consisting of (A) the compounds having the general formula (I):

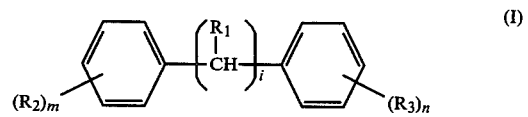

wherein $R_1$ is hydrogen or an alkyl group, $R_2$ and $R_3$ are independently hydrogen, an alkyl group, or an aryl group, i is 0, 1, 2, 3, or 4, and m and n are independently 0, 1, 2, or 3, (B) the oligomers styrene or the derivatives thereof, (C) the polymers of styrene or the derivatives thereof and (D) copolymers of (i) styrene or the derivatives thereof and (ii) ethylene or the derivatives thereof and, optionally, an aromatic solvent, without causing the decrease in the carbon monoxide absorbing and releasing capacities of the absorbing solution.

10 Claims, 2 Drawing Figures

PROCESS FOR SEPARATING CARBON MONOXIDE FROM A GAS MIXTURE

The present invention relates to a process for removing carbon monoxide from a gas mixture containing carbon monoxide together with nitrogen, oxygen, methane, carbon dioxide, and hydrogen.

BACKGROUND OF THE INVENTION

Carbon monoxide is a basic or fundamental raw material. Carbon monoxide is generally produced from coke and coal by using, for example, a gas generator, a water gas generator, a Winkler oven, a Lurgi gasifier or a Koppers oven. Carbon monoxide is further produced from a natural gas or petroleum hydrocarbon by a so-called steam reforming process or a so-called partial oxidation process. The product gases obtained from these processes contain, other than carbon monoxide, hydrogen, carbon dioxide, methane and nitrogen, as well as a small amount of water. For example, a water gas generally contains 35 through 40% carbon monoxide, 0.5 through 1.0% methane, 4 through 9% nitrogen and 1000 through 20,000 ppm of water. Furthermore, carbon monoxide is obtained, as a by-product, from a steel plant, an oil refinery, or a petrochemical plant. The carbon monoxide must be separated from these gas mixtures in order to be used as a chemical synthesis raw material.

On the other hand, hydrogen is also an important raw material and is separated from the above-mentioned various gas mixtures or waste gases from a petrochemical plant, such as those derived from the dehydrogenation step of hydrocarbons. The hydrogen thus obtained generally contains a small amount of carbon monoxide. This carbon monoxide must be separated and removed from hydrogen gas, since carbon monoxide poisons catalysts for reactions using hydrogen. Furthermore, the above-mentioned waste gases generally contain a small amount of water.

Known process for separating and removing carbon monoxide from a gas mixture include a so-called copper-liquor scrubbing process in which carbon monoxide is absorbed into an aqueous ammoniacal copper (I) formate solution or a suspension of copper (I) chloride in hydrochloric acid by contacting a gas mixture containing carbon monoxide with the copper solution or suspension at a room temperature under 150 through 200 atm. The absorbed carbon monoxide is then released from the copper solution or suspension by heating the copper solution or suspension under reduced pressure. The copper solution or suspension is thus regenerated and reused. However, this process has disadvantages in that it is difficult to control the operation in order to prevent corrosion of the apparatuses, loss of the copper solution or suspension and formation of precipitates and also the construction cost is high due to the use of high-pressure equipment.

Furthermore, a so-called cryogenic gas separation process is known to obtain a large amount of carbon monoxide having a high purity. In this process, a gas mixture is liquefied by cooling and is then fractionated at a low temperature of $-165°$ C. through $-210°$ C. However, this process also has disadvantages in that complicated refrigeration and heat recovery systems are required, the equipment is expensive due to the use of high-grade materials, the power consumption is large and the separation of carbon monoxide and nitrogen is difficult. In addition, water and carbon dioxide contained in the gas mixture should be removed from the gas mixture in a pre-treatment apparatus so that the content is less than 1 ppm, since clogging troubles occur in a low-temperature pipe line system when water and carbon dioxide are contained in the gas mixture.

British patent specification No. 1318790 discloses a process for the recovery of carbon monoxide having a purity of 95% from a gas mixture, in which the gas mixture containing 30 mol % of carbon monoxide is contacted with a toluene solution of aluminum copper(I) chloride $CuAlCl_4$ at a temperature of 25° C. The toluene solution containing the absorbed carbon monoxide releases carbon monoxide upon heating at a temperature of 80° C. Thus, 95% of carbon monoxide is recovered. However, this process still has disadvantages in that (1) the water content in the gas mixture must be strictly regulated to an amount of 1 ppm or less in an industrial application, since cuprous aluminum tetrachloride is irreversibly reacted with water present in the gas mixture and deactivated, as described by D. J. Haase and D. G. Walker in Chemical Engineering Progress, Vol 70, No. 5, pp 76, May 1974, (2) a gas mixture generally having a temperature of 60° C. or more must be cooled to, for example, 25° C., since the absorption of carbon monoxide is carried out at a temperature of $-10°$ C. through 40° C., usually 25° C. and (3) toluene vapor should be separated from the recovered carbon monoxide in a separate step, since the recovered carbon monoxide released from the toluene solution of cuprous aluminum tetrachloride at a temperature of 80° C. in a recovery system is saturated with the vapor of the toluene solvent.

Other various processes for separating carbon monoxide from gas mixtures have been proposed. However, there is no satisfactory process in the art for separating carbon monoxide from gas mixtures.

Accordingly, the objects of the present invention are to eliminate the above-mentioned disadvantages of the prior arts and to provide a process for separating carbon monoxide from a gas mixture by using an absorbing solution, which is capable of absorbing and releasing carbon monoxide under relatively mild conditions, and which is stable against the water contained in the gas mixture.

Another object of the present invention is to provide a process for separating carbon monoxide from a gas mixture in which the removal of the solvent vapor from the recovered carbon monoxide is simplified as compared with the conventional processes.

Other objects and advantages of the present invention will be apparent from the description set forth hereinbelow.

In accordance with the present invention, there is provided a process for separating carbon monoxide from a gas mixture comprising the step of:
  contacting the gas mixture with an absorbing solution containing (a) at least one copper (I) halide, (b) at least one aluminum (III) halide and (c) at least one compound having at least two benzene nuclei in one molecule thereof.

The above-mentioned component(c) is selected from the group consisting of the compounds having the general formula (I):

(I)

wherein $R_1$ is hydrogen or an alkyl group, $R_2$ and $R_3$ are independently hydrogen, an alkyl group, or an aryl group, i is 0, 1, 2, 3 or 4, and m and n are independently 0, 1, 2 or 3; the oligomers of styrene or the derivatives thereof; the polymers of styrene or the derivatives thereof; and the copolymers of (i) styrene or the derivatives thereof and (ii) ethylene or the derivatives thereof.

BRIEF DESCRIPTION OF THE DRAWINGS

The present invention will be better understood from the description set forth below with reference to the accompanying drawings, in which.

DETAILED DESCRIPTION OF THE INVENTION

The copper(I) halides (i.e. the component (a)) usable in the present invention include, for example, copper(I) chloride, and copper(I) bromide. These halides can be used alone or in any mixtures thereof.

The aluminum(III) halides (i.e. the component (b)) usable in the present invention include, for example, aluminum(III) chloride, and aluminum(III) bromide. These halides can be used alone or in any mixtures thereof.

The compounds having the above-mentioned general formula (I) usable as the component (c) in the present invention include, for example, diphenyl, 2-, 3-, or 4-methyldiphenyl, 2-, 3- or 4-ethyldiphenyl, 3,4-dimethyldiphenyl, 3,5-diethyldiphenyl, 3,3'-dimethyldiphenyl, 3,4'-dimethyldiphenyl, 4,4'-dimethyldiphenyl, 3,3'-diethyldiphenyl, 3,4'-diethyldiphenyl, 3,4'-diethyldiphenyl, 4,4'-diethyldiphenyl, diphenylmethane, 3 or 4-methyldiphenylmethane, (3,4-dimethylphenyl)-phenylmethane, (3,5-dimethylphenyl)phenylmethane, bis(3,methylphenyl)methane, (3-methylphenyl)(4-methylphenyl)methane, 3 or 4-ethyldiphenylmethane, 3,4-diethylphenylmethane, (3,5-diethylphenyl)-phenylmethane, bis(3-ethylphenyl)methane, (3-ethylphenyl)(4-ethylphenyl)methane, 1,1-diphenylethane, 1-(3 or 4-methylphenyl)-1-phenylethane, 1-(3,4-dimethylphenyl)-1-phenylethane, 1-(3,5-dimethylphenyl)-1-phenylethane, 1,1-bis(3 or 4-methylphenyl)ethane, 1-(3 or 4-ethylphenyl)-1-phenylethane, 1-(3,4-diethylphenyl)-1-phenylethane, 1-(3,5-diethylphenyl)-1-phenylethane, 1,1-bis(3 or 4-ethylphenyl)ethane, diphenylmethane, 1,2-diphenylethane, 1,3-diphenylpropane, 1,4-diphenylbutane. These compounds can be used alone or in any mixtures thereof.

The styrene derivatives usable in the formation of the oligomers, polymers or copolymers include, for example, α-methylstyrene, α-phenylstyrene, stilbene, styrene having one or two methyl, ethyl, or halogene substituents on 2-, 3- and/or 4-positions of the aromatic ring.

The ethylene derivatives usable in the formation of the copolymers of styrene or its derivatives therewith include, for example, propylene, butene-1, isobutene, 3-methylbutene-1, pentene-1, vinyl chloride, dienes such as butadiene, isoprene and chloroprene.

The oligomers and polymers of styrene or the derivatives thereof usable as the component (c) in the present invention are desirably those having a polymerization degree of 2 through 10000, desirably 2 through 500. These oligomers and polymers can be readily prepared in any conventional manners. The copolymers of styrene or the derivatives thereof with ethylene or the derivatives thereof are those having a content of styrene or the derivatives thereof of 10 through 99.9 mol %, desirably 30 mol % or more and having a polymerization degree of 2 through 10000, desirably 2 through 500. The use of the polymers or copolymers having a too high polymerization degree results in the increase in the viscosity of the resultant absorbing solution, which causes the decrease in the carbon monoxide absorbing power or capacity of the absorbing solution. Furthermore, in the case where a non-aromatic carbon-carbon double bond is present in the above-mentioned oligomers, polymers and copolymers, the double bond is desirably saturated by, for example, hydrogenation. This is because the presence of the carbon-carbon double bond in the above-mentioned oligomers, polymers and copolymers tends to cause a side reaction during the preparation of the absorbing solution or the separation of the absorbed carbon monoxide.

It should be noted that, when the above-mentioned oligomers or polymers, or copolymers having a polymerization degree of 2 or more are used, an aromatic solvent such as benzene, toluene, xylene, ethylbenzene, propylbenzene and mesitylene is also incorporated into the absorbing solution for the reason that the viscosity of the absorbing solution is decreased so that the absorption efficiency increases. These aromatic solvents can be used alone or in any mixture thereof.

The absorbing solution according to the present invention can be prepared by heating the above-mentioned component (c) including the compounds having the general formula (I) and the oligomers, polymers and copolymers together with the above-mentioned components (a) and (b)(i.e.) copper(I) halide or halides and the aluminum(III) halide or halides, respectively at a temperature of 20° through 150° C., desirably 30° through 80° C. for several hours with stirring. In the preparation of the absorbing solution, an aromatic solvent, such as benzene, toluene, xylene, ethylbenzene, propylbenzene and mesitylene may be suitably used as a solvent.

The molar ratio of the copper(I) halide to the aluminum(III) halide contained in the absorbing solution is generally 0.9 through 3, desirably 1.0 through 1.3. The molar ratio of the compound having the general formula (I) to the copper(I) halide is generally 0.5 through 50, desirably 1 through 10. The molar ratio of the above-mentioned oligomer, polymer or copolymer, in terms of the aromatic ring residue, to the copper (I) halide is generally 1.0 through 100, desirably 2.0 through 30.

A molar ratio of the copper(I) halide to the aluminum(III) halide of less than 0.9 tends to decrease the absorption capacity per volume of the solution and also to give rise to undesirable side reaction by aluminum halide. Contrary to this, a molar ratio of the copper(I) halide to the aluminum(III) halide of more than 3 tends to result in precipitation of a large amount of copper(I) halide in the solution.

A molar ratio of the compound having the general formula (I) to the copper(I) halide of less than 0.5 tends to decrease the water resistivity of the absorbing solution. Contrary to this, a molar ratio of the compound having the general formula (I) to the copper(I) halide of more than 50 tends to decrease the absorption capacity of the absorbing solution.

A molar ratio of the above-mentioned oligomer, polymer, or copolymer, in terms of the aromatic ring residue, to the copper(I) halide of less than 1.0 tends to decrease the water resistivity of the absorbing solution.

A molar ratio of the above-mentioned oligomer, polymer, or copolymer, in terms of the aromatic ring residue, to the copper(I) halide of more than 100, decreases the absorption capacity per volume of the absorbing solution.

In the case where an aromatic solvent is incorporated into the absorbing solution, the molar ratio of the aromatic solvent to the copper (I) halide is generally 0.5 through 30, desirably 3 through 10. The use of a too small amount of the aromatic solvent tends to result in an absorbing solution having a high viscosity. Contrary to this, the use of a too large amount of the aromatic solvent tends to decrease the absorption capacity per volume of the absorbing solution.

The absorption of carbon monoxide according to the present invention can be generally carried out at a temperature of 20° through 100° C., desirably 20° through 80° C. under normal pressures (although the elevated pressure can be used if necessary). The absorbed carbon monoxide is readily released by heating the absorbing solution at a temperature of 80° through 200° C., desirably 90° through 140° C. The absorption of carbon monoxide according to the present invention can also be carried out at a temperature of more than 100° C. when the pressure of the gas mixture is more than 1 atm. The absorption of carbon monoxide according to the present invention can also be carried out at a temperature of less than 20° C., so long as the compound or compounds having the general formula (I) and having a solidifying point of less than 20° C. are used.

The carbon monoxide absorbing solution according to the present invention is stable against water. For instance, no substantial decrease in the absorbing capacity or power of the absorbing solution according to the present invention was observed after the absorbing solution was contacted with a nitrogen stream containing water at a temperature of 50° C. through 70° C. for 10 minutes and was, then, contacted with high-purity carbon monoxide, as illustrated in Example 1 below. Furthermore, the absorbing solution according to the present invention has high rates of absorption and readily releases carbon monoxide.

As is also shown in Examples 4, 5 and 6 below, no substantial decrease in the carbon monoxide absorbing capacity or power of the absorbing solution was observed after the absorbing solution was contacted with a nitrogen stream containing 8700 ppm of water at a temperature of 20° C. for 10 minutes. The carbon monoxide absorption rate of the absorbing solution was rapid and the absorbed carbon monoxide was rapidly released from the absorbing solution by heating the absorbing solution to a temperature of 80° through 100° C. Contrary to this, as shown in Comparative Example 1 below, in the case where an absorbing solution not containing the compound having the general formula (I) (i.e. an absorbing solution containing copper(I) halide, aluminum(III) halide and an aromatic solvent) was used, the carbon monoxide absorbing capacity or power of the absorbing solution was remarkably decreased, after the absorbing solution was contacted with a nitrogen gas containing water. As is clear from the comparison of these results, the absorbing solution according to the present invention is superior to the conventional absorbing solution.

As is further clear from Example 7 below, no substantial decrease in the carbon monoxide absorbing capacity or power of the absorbing solution was observed after the absorbing solution was contacted with a nitrogen gas stream containing 8700 ppm of water at temperature of 70° C. for 10 minutes. Similarly, as in Example 9, no substantial decrease in the carbon monoxide absorbing capacity or power of the absorbing solution was observed even after the absorbing solution was contacted with a nitrogen gas stream containing the saturated vapor pressure of water (i.e. approximately 23,100 ppm) at a temperature of 20° C. for 10 minutes. The carbon monoxide absorption rate of the absorbing solution was rapid and the absorbed carbon monoxide was rapidly released from the absorbing solution by heating the absorbing solution to a temperature of 80° through 100° C.

Still furthermore, as shown in Example 12, even in the case where a gas mixture containing carbon monoxide and a high content of water (i.e. 8700 ppm) was directly contacted with the absorbing solution to absorb the carbon monoxide into the absorbing solution and where the resultant absorbing solution was heated to a temperature of 90° C., no substantial decrease in the carbon monoxide absorbing and releasing capacities of the absorbing solution was observed as compared with Example 8 in which a gas mixture containing no water was absorbed. Contrary to this, as shown in Comparative Example 2, in the case where the absorbing solution consisting essentially of copper(I) halide, the aluminum-(III) halide and the aromatic solvent was used, the remarkable decrease in the carbon monoxide absorption capacity of the absorbing solution was observed. In addition, generally speaking, it is not necessary to remove the component (c) (i.e. the compounds having the general formula (I), or the above-mentioned oligomers, polymers or copolymers) from the recovered carbon monoxide since the compounds having the general formula (I) and the above-mentioned oligomers, polymers and copolymers have a low vapor pressure.

The gas mixture which can be utilized as a starting gas in the present invention desirably contains 1.0 through 99% by volume of carbon monoxide and less than a saturated vapor pressure (e.g. approximately 40,000 ppm by volume at 30° C.) of water.

DESCRIPTION OF THE PREFERRED EMBODIMENTS

The present invention will now be further illustrated by, but is by no means limited to, the following examples.

EXAMPLE 1

The following chemicals and gases were used in this example.

Aluminum(III) chloride: Special grade chemical aluminum (III) chloride, manufactured by Kishida Kagaku Kogyo Kabushiki Kaisha (Japan), was purified by dewatering the same by means of a vacuum sublimation method.

Copper(I) chloride: Special grade chemical copper(I) chloride, manufactured by Komune Kagaku Yakuhin Kabushiki Kaisha (Japan), was purified by means of re-precipitation, ethanol and ether washing, and vacuum drying.

1,2-Diphenylethane: Special grade chemical 1,2-diphenylethane, manufactured by Tokyo Kasei Kabushiki Kaisha (Japan).

Carbon monoxide: A bomb gas (purity: 99.95%), manufactured by Takachiho Kagaku Kabushiki Kaisha (Japan), was dried and purified by passing the gas through a column packed with molecular sieve 3A (Nikka Seiko Kabushiki Kaisha, Japan) just before use.

Nitrogen: A bomb gas (purity: 99.999%), obtained from Kabushiki Kaisha Suzuki Shokan (Japan), was dried and purified by passing the gas through a column packed with molecular sieve 3A (Nikka Seiko Kabushiki Kaisha, Japan) just before use.

Into a 200 ml two-necked, eggplant-type flask, 24.8 g (136 mmol) of 1,2-diphenylethane, 5.6 g (42 mmol) of aluminum (III) chloride, and 4.2 g (42 mmol) of copper(I) chloride were charged under a dry nitrogen atmosphere. The mixture was heated at a temperature of 65° C. for 4 hours while being stirred with a magnetic stirrer. Thus, an absorbing solution was prepared.

The absorbing solution was charged into a 200 ml two-necked, eggplant-type flask and then the carbon monoxide gas was absorbed into the absorbing solution at 55° C. by connecting the flask to a vessel containing carbon monoxide at 1 atm. The amount of carbon monoxide absorbed into the absorbing solution was determined according to the gas burette method.

The carbon monoxide was rapidly absorbed into the absorbing solution. That is, 8.9 mmol of carbon monoxide was absorbed after 5 minutes and 19.1 mmol of carbon monoxide, which was approximately the equibrium absorption amount, was absorbed after 120 minutes.

The carbon monoxide absorbed solution was heated to a temperature of 120° C. under 1 atm and the amount of the gas released was measured by means of the gas burette method. The carbon monoxide was rapidly released or desorbed from the absorbing solution. The amount of carbon monoxide released was 19.1 mmol after 10 minutes. 1,2-Diphenylethane was not detected in the separated carbon monoxide when the separated carbon monoxide was analyzed by means of gas chromatography.

Ten liters of a nitrogen gas containing 76 mg (4.2 mmol) of water (i.e. water content: 10100 ppm) and having a pressure of 1 atm was prepared.

A vessel containing the prepared nitrogen gas was connected to a 200 ml two-necked, eggplant-type flask containing the above-mentioned absorbing solution. The nitrogen gas was circulated through the flask by means of a BA-106T air pump (manufactured by Kabushiki Kaisha Iwaki, Japan) at a temperature of 55° C. for 10 minutes so that the nitrogen gas passed through the overhead space of the absorbing solution, which was stirred by means of a magnetic stirrer.

Thereafter, the flask containing the absorbing solution mentioned above was connected to the vessel containing the carbon monoxide gas having a pressure of 1 atm. Thus, the carbon monoxide was absorbed into the absorbing solution while the absorbing solution was stirred at a temperature of 55° C. by means of the magnetic stirrer.

The carbon monoxide was rapidly absorbed into the absorbing solution. That is, 8.9 mmol of carbon monoxide was absorbed after 5 minutes and 19.1 mmol of carbon monoxide, which was approximately the equibrium absorption amount, was absorbed after 120 minutes. As is clear from these results, the absorption rate and the amount of absorbed carbon monoxide after contact is made between the absorbing solution and the nitrogen gas containing 10100 ppm of water are substantially the same as those prior to contact.

The carbon monoxide absorbed solution was heated to a temperature of 120° C. under 1 atm, thereby causing the carbon monoxide to be rapidly released. The amount of carbon monoxide released was 19.1 mmol after 10 minutes. In addition, when the absorbing solution was cooled to a temperature of 20° C., the absorbing solution solidified after absorbing 26.8 mmol of the carbon monoxide.

EXAMPLE 2

The chemicals and gases used in Example 1 were used, except that diphenyl (i.e. first grade chemical manufactured by Tokyo Kasei Kabushiki Kaisha, Japan) was used in lieu of 1,2-diphenylethane.

Into a 200 ml two-necked, eggplant-type flask, 11.8 g (77 mmol) of diphenyl, 3.3 g (24 mmol) of aluminum-(III) chloride and 2.4 g (24 mmol) of copper(I) chloride were charged under a dry nitrogen atmosphere. The mixture was heated at a temperature of 80° C. for 4.5 hours while being stirred with a magnetic stirrer. Thus, an absorbing solution was prepared.

The absorbing solution was charged into a 200 ml two-necked, eggplant-type flask and, then, the carbon monoxide gas was absorbed into the absorbing solution at 70° C. by connecting the flask to a vessel containing carbon monoxide at 1 atm. The amount of carbon monoxide absorbed into the absorbing solution was determined according to the gas burette method.

The carbon monoxide was rapidly absorbed into the absorbing solution. That is, 7.8 mmol of carbon monoxide was absorbed after 2 minutes and, then, 9.7 mmol of carbon monoxide, which was approximately the equibrium absorption amount, was absorbed after 60 minutes.

The carbon monoxide absorbed solution was heated to a temperature of 120° C. under 1 atm and the amount of the gas released was measured by means of the gas burette method. The carbon monoxide was rapidly released or desorved from the absorbing solution. The amount of carbon monoxide released was 9.7 mmol after 10 minutes. Diphenyl was not detected in the separated carbon monoxide when the separated carbon monoxide was analyzed by means of gas chromatography.

Ten liters of a nitrogen gas containing 44 mg (2.4 mmol) of water (i.e. water content: 5800 ppm) and having a pressure of 1 atm was prepared. This nitrogen gas passed through the overhead space of the absorbing solution at a temperature of 70° C. for 10 minutes.

Thereafter, the flask containing the absorbing solution mentioned above was connected to the vessel containing the carbon monoxide gas having a pressure of 1 atm. Thus, the carbon monoxide was absorbed into the absorbing solution, while the absorbing solution was stirred at a temperature of 70° C. by means of the magnetic stirrer.

The carbon monoxide was rapidly absorbed into the absorbing solution. That is, 7.8 mmol of carbon monoxide was absorbed after 2 minutes and 9.7 mmol of carbon monoxide, which was approximately the equibrium absorption amount, was absorbed after 60 minutes.

As is clear from these results, the absorption rate and amount of the absorbed carbon monoxide after contacting with the nitrogen gas containing 5800 ppm of water are substantially the same as those prior to contact.

EXAMPLE 3

The chemicals and gases used in Example 1 were used, except that a 1:1 mixture of 1-ethylphenyl-1-phenylethane and 1-bis (ethylphenyl) ethane was used in lieu of 1,2-diphenylethane.

Into a 100 ml two-necked, eggplant-type flask, 20 ml of the 1:1 mixture, 1.7 g (12 mmol) of aluminum(III) chloride and 1.2 g (12 mmol) of copper(I) chloride were charged under a dry nitrogen atmosphere. The mixture was heated at a temperature of 70° C. for 4 hours while being stirred with a magnetic stirrer. Thus, an absorbing solution was prepared.

The absorbing solution was charged into a 100 ml two-necked, eggplant-type flask and, then, the carbon monoxide gas was absorbed into the absorbing solution at 70° C. by connecting the flask to a vessel containing carbon monoxide at 1 atm. The amount of carbon monoxide absorbed into the absorbing solution was determined according to the gas burette method.

The carbon monoxide was rapidly absorbed into the absorbing solution. That is, 3.0 mmol of carbon monoxide was absorbed after 3 minutes and, then, 4.0 mmol of carbon monoxide, which was approximately the equibrium absorption amount, was absorbed after 20 minutes.

The carbon monoxide absorbed solution was heated to a temperature of 123° C. under 1 atm and the amount of the gas released was measured by means of the gas burette method. The carbon monoxide was rapidly released or desorved from the absorbing solution. The amount of carbon monoxide released was 4.0 mmol after 10 minutes. 1-Ethylphenyl-1-phenylethane and 1,1-bis (ethylphenyl) ethane were not detected in the separated carbon monoxide when the separated carbon monoxide was analyzed by means of gas chromatography.

Ten liters of a nitrogen gas containing 8 mg (0.44 mmol) of water (i.e. water content: 1000 ppm) and having a pressure of 1 atm was prepared. This nitrogen gas passed through the overhead space of the absorbing solution at a temperature of 70° C. for 10 minutes.

Thereafter, the flask containing the absorbing solution mentioned above was connected to the vessel containing the carbon monoxide gas having a pressure of 1 atm. Thus, the carbon monoxide was absorbed into the absorbing solution, while the absorbing solution was stirred at a temperature of 70° C. by means of the magnetic stirrer.

The carbon monoxide was rapidly absorbed into the absorbing solution. That is, 2.8 mmol of carbon monoxide was absorbed after 3 minutes and 4.0 mmol of carbon monoxide, which was approximately the equibrium absorption amount, was absorbed after 20 minutes.

As is clear from these results, the absorption rate and amount of the absorbed carbon monoxide after contacting with the nitrogen gas containing 1000 ppm of water are substantially the same as those prior to contact.

EXAMPLE 4

The following chemicals and gases were used in this example.

Aluminum(III) chloride: Special grade chemical aluminum (III) chloride, manufactured by Kishida Kagaku Kogyo Kabushiki Kaisha (Japan), was purified by dewatering the same by means of a vacuum sublimation method.

Copper(I) chloride: Special grade chemical copper(I) chloride, manufactured by Komune Kagaku Yakuhin Kabushiki Kaisha (Japan), was used.

Toluene: First grade chemical toluene, obtained from Takahashi Tokichi Shoten (Japan), was dehydrated with sodium metal, followed by distillation.

Diphenylmethane: Special grade chemical diphenylmethane manufactured by Tokyo Kasei Kabushiki Kaisha (Japan).

Carbon monoxide: A bomb gas (purity: 99.95%) obtained from Takachiho Kagaku Kabushiki Kaisha (Japan), was dried and purified by passing the gas through a column packed with molecular sieve 3A (Nikka Seiko Kabushiki Kaisha) just before use.

Nitrogen: A bomb gas (purtiy: 99.999%), obtained from Kabushiki Kaisha Suzuki Shokan (Japan), was dried and purified by passing the gas through a column packed with molecular sieve 3A (Nikka Seiko Kabushiki Kaisha, Japan) just before use.

Into a 200 ml two-necked, eggplant-type flask, 3.0 g (18 mmol) of diphenylmethane, 2.4 g (18 mmol) of aluminum(III) chloride, 1.8 g (18 mmol) of copper(I) chloride and 20 ml of toluene were charged under a dry nitrogen atmosphere. The mixture was heated at a temperature of 40° C. for 4 hours while being stirred with a magnetic stirrer. Thus, an absorbing solution was prepared.

The absorbing solution was charged into a 200 ml two-necked, eggplant-type flask and, then, the carbon monoxide gas was absorbed into the absorbing solution at 20° C. by connecting the flask to a vessel containing a gas mixture of carbon monoxide and nitrogen at 1 atm (partial pressure: CO 0.8 atm, $N_2$ 0.2 atm). The gas mixture was circulated through the overhead space of the absorbing solution by means of a BA-106T air pump (manufactured by Kabushiki Kaisha Iwaki, Japan) during the initial 10 min. absorption period, while the absorbing solution was stirred with a magnetic stirrer. The amount of carbon monoxide absorbed into the absorbing solution was determined at 20° C. according to the gas burette method.

Figure 1:
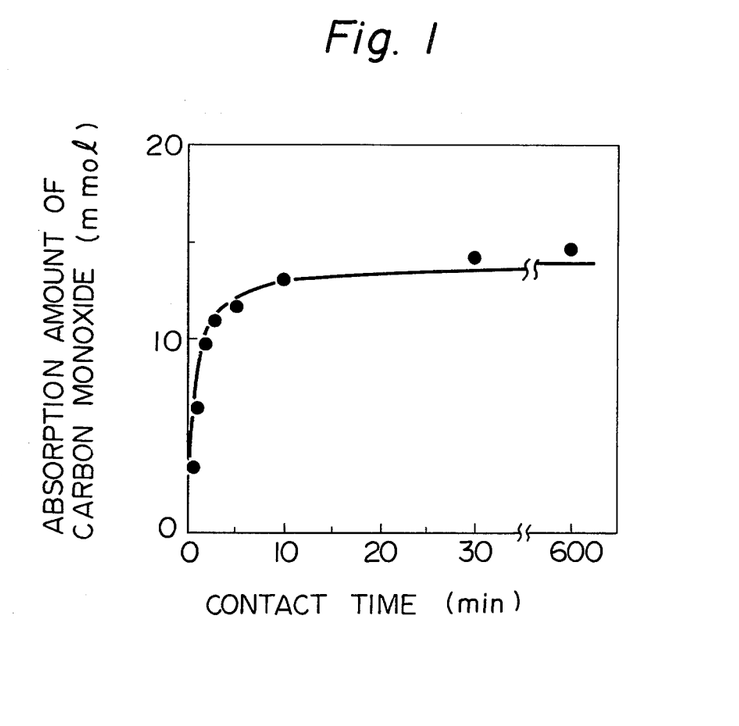
FIG. 1 is a graphical drawing illustrating the correlation between the absorption amount of carbon monoxide and the contact time in Example 4.

As shown in the solid curve of FIG. 1, the carbon monoxide was rapidly absorbed into the absorbing solution. That is, 11.7 mmol of carbon monoxide was absorbed after 3 minutes and 14.0 mmol of carbon monoxide, which was approximately the equilibrium absorption amount, was absorbed after 10 hours.

The carbon monoxide absorbed solution in the flask was heated to a temperature of 90° C. under 1 atm, while the spiral condenser provided at the top of the flask was cooled with tap water. The amount of the gas released was measured by means of the gas burette method. The carbon monoxide was rapidly released from the absorbing solution. The amount of carbon monoxide released was 14.0 mmol after 5 minutes.

Five liters of a nitrogen gas containing 32 mg (1.8 mmol) of water (i.e. water content: 8700 ppm) and having a pressure of 1 atm was prepared.

A vessel containing the nitrogen gas prepared above was connected to a 200 ml two-necked eggplant-type flask containing the above-prepared absorbing solution. The nitrogen gas was circulated through the flask by means of a BA-106T air pump (manufactured by Kabushiki Kaisha Iwaki, Japan) at a temperature of 20° C. for 10 minutes, so that the nitrogen gas passed through the overhead space of the absorbing solution which was stirred by means of a magnetic stirrer.

Thereafter, the flask containing the absorbing solution mentioned above was connected to the vessel containing the above-mentioned gas mixture having a pressure of 1 atm (partial pressure: CO 0.8 atm, $N_2$ 0.2 atm). The gas mixture was circulated through the overhead space of the absorbing solution by means of the air pump, while the absorbing solution was stirred at a temperature of 20° C. by means of the magnetic stirrer. The carbon monoxide was rapidly absorbed into the absorbing solution. As shown in the circle points of FIG. 1, no substantial decrease in the carbon monoxide absorption rate and amount of the absorbing solution was observed as compared with the absorbing solution prior to contact with the humid gas.

When the carbon monoxide absorbed solution was heated to a temperature of 90° C. under 1 atm, the carbon monoxide was rapidly released from the absorbing solution. The amount of carbon monoxide released was 13.8 mmol after 5 minutes.

EXAMPLE 5

The same procedure as described in Example 4 were used, except that 3.2 g (18 mmol) of 1,2-diphenylethane (i.e. special grade chemical manufactured by Tokyo Kasei Kabushiki Kaisha, Japan) was used in lieu of diphenylmethane.

Before the absorbing solution was contacted with a nitrogen gas containing 8700 ppm of water, the carbon monoxide gas was absorbed into the absorbing solution by circulating 1 liter of the gas mixture of carbon monoxide and nitrogen having a pressure of 1 atm (partial pressure: CO 0.8 atm, $N_2$ 0.2 atm) through the overhead space of the absorbing solution at a temperature of 20° C., while the absorbing solution was stirred with a magnetic stirrer. The carbon monoxide was rapidly absorbed into the absorbing solution. That is, 14.9 mmol of carbon monoxide, which was approximately the equibrium absorption amount, was absorbed after 10 hours.

The carbon monoxide absorbed solution was heated to a temperature of 90° C. under 1 atm and the amount of the gas released was measured by means of the gas burette method. The carbon monoxide was rapidly released or desorbed from the absorbing solution. The amount of carbon monoxide released was 14.7 mmol after 5 minutes.

Then, 5 liters of the nitrogen gas containing 8700 ppm of water and having a pressure of 1 atm was circulated through the overhead space of the absorbing solution in the flask by means of the air pump, while the absorbing solution was stirred at a temperature of 20° C. for 10 minutes with a magnetic stirrer.

Thereafter, 1 liter of the gas mixture of carbon monoxide and nitrogen having a pressure of 1 atm (partial pressure: CO 0.8 atm, $N_2$ 0.2 atm) was circulated through the overhead of the absorbing solution while being stirred with a magnetic stirrer. Thus, carbon monoxide was rapidly absorbed into the absorbing solution. That is, 15.2 mmol of carbon monoxide, which was approximately the equibrium absorption amount, was absorbed after 10 hours. When the resultant absorbing solution was heated to a temperature of 90° C. at 1 atm, the carbon monoxide was rapidly released. The amount of carbon monoxide released was 15.2 mmol after 5 minutes.

EXAMPLE 6

The same procedure as described in Example 4 were used, except that 2.1 g (11.8 mmol) of 1,1-diphenylethylene (i.e. special grade chemical manufactured by Tokyo Kasei Kabushiki Kaisha, Japan) was used in lieu of diphenylmethane.

Before the absorbing solution was contacted with a nitrogen gas containing 8700 ppm of water, the carbon monoxide gas was absorbed into the absorbing solution by circulating 1 liter of the gas mixture of carbon monoxide and nitrogen having a pressure of 1 atm (partial pressure: CO 0.8 atm, $N_2$ 0.2 atm) through the overhead space of the absorbing solution at a temperature of 20° C., while the absorbing solution was stirred with a magnetic stirrer. The carbon monoxide was rapidly absorbed into the absorbing solution. That is, 14.8 mmol of carbon monoxide, which was approximately the equibrium absorption amount, was absorbed after 10 hours.

The carbon monoxide absorbed solution was heated to a temperature of 90° C. under 1 atm and the amount of the gas released was measured by means of the gas burette method. The carbon monoxide was rapidly released or desorbed from the absorbing solution. The amount of carbon monoxide released was 14.7 mmol after 5 minutes.

Thereafter, 1 liter of the gas mixture of carbon monoxide and nitrogen having a pressure of 1 atm (partial pressure: CO 0.8 atm, $N_2$ 0.2 atm) was circulated through the overhead of the absorbing solution while being stirred with a magnetic stirrer. Thus, carbon monoxide was rapidly absorbed into the absorbing solution. That is, 14.6 mmol of carbon monoxide, which was approximately the equibrium absorption amount, was absorbed after 10 hours. When the resultant absorbing solution was heated to a temperature of 90° C. at 1 atm, the carbon monoxide was rapidly released. The amount of carbon monoxide released was 14.5 mmol after 5 minutes.

COMPARATIVE EXAMPLE 1

The same chemicals and gases as used in Example 4 were used.

Into a 200 ml two-necked, eggplant-type flask, 2.4 g (18 mmol) of aluminum(III) chloride, 1.8 g (18 mmol) of copper(I) chloride and 20 ml of toluene were charged under a dry nitrogen atmosphere. The mixture was heated at a temperature of 40° C. for 4 hours while being stirred with a magnetic stirrer. Thus, an absorbing solution was prepared.

The absorbing solution thus obtained was prepared in the same manner as in Example 4, except that diphenylmethane was not contained. The method of measurement of the amount of carbon monoxide and the method of contact of the absorbing solution with water were also the same as in Example 4.

The absorbing solution was charged into a 200 ml two-necked, eggplant-type flask and, then, the carbon monoxide gas was absorbed into the absorbing solution at 20° C. by connecting the flask to a vessel containing a gas mixture of carbon monoxide and nitrogen at 1 atm (partial pressure: CO 0.8 atm, $N_2$ 0.2 atm). The gas mixture was circulated through the overhead space of the absorbing solution by means of a BA-106T air pump (manufactured by Kabushiki Kaisha Iwaki, Japan) during the initial 10 min. absorption period, while the absorbing solution was stirred with a magnetic stirrer. The amount of carbon monoxide absorbed into the absorbing solution was determined at 20° C. according to the gas burette method.

The carbon monoxide was rapidly absorbed into the absorbing solution. That is, 12.0 mmol of carbon monoxide was absorbed after 3 minutes and 13.9 mmol of carbon monoxide, which was approximately the equibrium absorption amount, was absorbed after 10 hours.

The carbon monoxide absorbed solution in the flask was heated to a temperature of 90° C. under 1 atm, while the spiral condenser provided at the top of the flask was cooled with tap water. The amount of the gas released was measured by means of the gas burette method. The carbon monoxide was rapidly released from the absorbing solution. The amount of carbon monoxide released was 13.9 mmol after 5 minutes.

Five liters of a nitrogen gas containing 32 mg (1.8 mmol) of water (i.e. water content: 8700 ppm) and having a pressure of 1 atm was prepared.

A vessel containing the nitrogen gas prepared above was connected to a 200 ml two-necked eggplant-type flask containing the above-prepared absorbing solution. The nitrogen gas was circulated through the flask by means of a BA-106T air pump (manufactured by Kabushiki Kaisha Iwaki, Japan) at a temperature of 20° C. for 10 minutes, so that the nitrogen gas passed through the overhead space of the absorbing solution which was stirred by means of a magnetic stirrer.

Thereafter, the flask containing the absorbing solution mentioned above was connected to the vessel containing the above-mentioned gas mixture having a pressure of 1 atm (partial pressure: CO 0.8 atm, $N_2$ 0.2 atm). The gas mixture was circulated through the overhead space of the absorbing solution by means of the air pump, while the absorbing solution was stirred at a temperature of 20° C. by means of the magnetic stirrer. The carbon monoxide was rapidly absorbed into the absorbing solution. That is, 8.9 mmol of carbon monoxide was absorbed after 3 minutes and 10.3 mmol of carbon monoxide, which was approximately the equibrium absorption amount, was absorbed after 10 hours. Accordingly, the carbon monoxide absorption capacity of the absorbing solution was decreased by 26% after the absorbing solution was contacted with 5 liters of the humid gas containing 8700 ppm of water. When the carbon monoxide absorbed solution was heated to a temperature of 90° C. under 1 atm, the carbon monoxide was rapidly released from the absorbing solution. The amount of carbon monoxide released was 10.2 mmol after 5 minutes.

Furthermore, 5 liters of nitrogen gas containing 8700 ppm of water and having a pressure of 1 atm was again prepared. This nitrogen gas was circulated through the overhead of the absorbing solution at a temperature of 20° C. for 10 minutes by means of the air pump, while the absorbing solution was stirred with a magnetic stirrer.

Thereafter, the flask containing the absorbing solution mentioned above was connected to the vessel containing the above-mentioned gas mixture having a pressure of 1 atm (partial pressure: CO 0.8 atm, $N_2$ 0.2 atm). The gas mixture was circulated through the overhead space of the absorbing solution by means of the air pump, while the absorbing solution was stirred at a temperature of 20° C. by means of the magnetic stirrer. The carbon monoxide was rapidly absorbed into the absorbing solution. That is, 4.9 mmol of carbon monoxide was absorbed after 3 minutes and 6.7 mmol of carbon monoxide, which was approximately the equibrium absorption amount, was absorbed after 10 hours. Accordingly, the carbon monoxide absorption capacity of the absorbing solution was further decreased by 26% after the absorbing solution was again contacted with 5 liters of the humid gas containing 8700 ppm of water.

EXAMPLE 7

The following chemicals and gases were used in this example.

Aluminum(III) chloride: Special grade chemical aluminum (III) chloride, manufactured by Kishida Kagaku Kogyo Kabushiki Kaisha (Japan), was purified by dewatering the same by means of a vacuum sublimation method.

Copper(I) chloride: Special grade chemical copper(I) chloride, manufactured by Komune Kagaku Yakuhin Kabushiki Kaisha (Japan), was used.

Styrene oligomer: Polystyrene oligomer A-300 manufactured by Toyo Soda Kabushiki Kaisha (Japan) (a mixture of oligomers having a polymerization degree of 2, 3, 4, 5, 6, 7 and 8, mol % of which are 24, 32, 22, 13, 6, 2 and 1%, respectively).

Carbon monoxide: A bomb gas (purity: 99.95%) obtained from Takachiho Kagaku Kabushiki Kaisha (Japan), was dried and purified by passing the gas through a column packed with molecular sieve 3A (Nikka Seiko Kabushiki Kaisha) just before use.

Nitrogen: A bomb gas (purity: 99.999%), obtained from Kabushiki Kaisha Suzuki Shokan (Japan), was dried and purified by passing the gas through a column packed with molecular sieve 3A (Nikka Seiko Kabushiki Kaisha, Japan) just before use.

Into a 200 ml two-necked, eggplant-type flask, 10.0 g (106 mmol in terms of the residual group equivalent) of the polystyrene oligomer, 2.4 g (18 mmol) of aluminum-(III) chloride and 1.8 g (18 mmol) of copper(I) chloride were charged under a dry nitrogen atmosphere. The mixture was heated at a temperature of 70° C. for 4 hours while being stirred with a magnetic stirrer. Thus, an absorbing solution was prepared.

The absorbing solution was charged into a 200 ml two-necked, eggplant-type flask and, then, the carbon monoxide gas was absorbed into the absorbing solution at 70° C. by connecting the flask to a vessel containing a gas mixture of carbon monoxide and nitrogen at 1 atm (partial pressure: CO 0.9 atm, $N_2$ 0.1 atm). The gas mixture was circulated through the overhead space of the absorbing solution by means of a BA-106T air pump (manufactured by Kabushiki Kaisha Iwaki, Japan) during the initial 10 min. absorption period, while the absorbing solution was stirred with a magnetic stirrer. The amount of carbon monoxide absorbed into the absorbing solution was determined at 20° C. according to the gas burette method. The carbon monoxide was rapidly absorbed into the absorbing solution. That is, 4.6 mmol of carbon monoxide was absorbed after 3 minutes and 6.3 mmol of carbon monoxide, which was approximately the equibrium absorption amount, was absorbed after 20 minutes.

The carbon monoxide absorbed solution in the flask was heated to a temperature of 125° C. under 1 atm and the amount of the gas released was determined by means of the gas burette method. The carbon monoxide was rapidly released from the absorbing solution. The amount of carbon monoxide released was 6.3 mmol after 5 minutes.

Five liters of a nitrogen gas containing 32 mg (1.8 mmol) of water (i.e. water content: 8700 ppm) and having a pressure of 1 atm was prepared.

A vessel containing the nitrogen gas prepared above was connected to a 200 ml two-necked eggplant-type flask containing the above-prepared absorbing solution. The nitrogen gas was circulated through the flask by means of a BA-106T air pump (manufactured by Kabushiki Kaisha Iwaki, Japan) at a temperature of 70° C. for 10 minutes, so that the nitrogen gas passed through the overhead space of the absorbing solution which was stirred by means of a magnetic stirrer.

Thereafter, the flask containing the absorbing solution mentioned above was connected to the vessel containing the above-mentioned gas mixture having a pressure of 1 atm (partial pressure: CO 0.9 atm, $N_2$ 0.1 atm). The gas mixture was circulated through the overhead space of the absorbing solution by means of the air pump, while the absorbing solution was stirred at a temperature of 70° C. by means of the magnetic stirrer. The carbon monoxide was rapidly absorbed into the absorbing solution. That is, 6.3 mmol of carbon monoxide, which was approximately the equibrium absorption amount, was absorbed after 20 minutes. Thus, no substantial decrease in the carbon monoxide absorption rate and amount of the absorbed carbon monoxide was observed as compared with the absorbing solution prior to contact with the humid gas containing 8700 ppm of water.

When the carbon monoxide absorbed solution was heated to a temperature of 125° C. under 1 atm, the carbon monoxide was rapidly released from the absorbing solution. The amount of carbon monoxide released was 6.3 mmol after 5 minutes.

EXAMPLE 8

The following chemicals and gases were used in this example.

Aluminum(III) chloride: Special grade chemical aluminum (III) chloride, manufactured by Kishida Kagaku Kogyo Kabushiki Kaisha (Japan), was purified by dewatering the same by means of a vacuum sublimation method.

Copper(I) chloride: Special grade chemical copper(I) chloride, manufactured by Komune Kagaku Yakuhin Kabushiki Kaisha (Japan), was used.

Toluene: First grade chemical toluene, obtained from Takahashi Tokichi Shoten (Japan), was dehydrated with sodium metal, followed by distillation.

Polystyrene: Polystyrene in the form of a pellet and having a polymerization degree of 1600 through 1800 (manufactured by Wako Junyaku Kogyo Kabushiki Kaisha, Japan) was purified by reprecipitating three times in a chloroform-methanol mixture and drying in vacuo at a temperature of 20° C. for 24 hours.

Carbon monoxide: A bomb gas (purity: 99.95%) obtained from Takachiho Kagaku Kabushiki Kaisha (Japan), was dried and purified by passing the gas through a column packed with molecular sieve 3A (Nikka Seiko Kabushiki Kaisha) just before use.

Nitrogen: A bomb gas (purity: 99.999%), obtained from Kabushiki Kaisha Suzuki Shokan (Japan), was dried and purified by passing the gas through a column packed with molecular sieve 3A (Nikka Seiko Kabushiki Kaisha, Japan) just before use.

Into a 200 ml two-necked, eggplant-type flask, 1.9 g (18 mmol in terms of the residual group equivalent) of polystyrene, 2.4 g (18 mmol) of aluminum(III) chloride, 1.8 g (18 mmol) of copper(I) chloride and 20 ml of toluene were charged under a dry nitrogen atmosphere. The mixture was heated at a temperature of 40° C. for 4 hours while being stirred with a magnetic stirrer. Thus, an absorbing solution was prepared.

The absorbing solution was charged into a 200 ml two-necked, eggplant-type flask and, then, the carbon monoxide gas was absorbed into the absorbing solution at 20° C. by connecting the flask to a vessel containing a gas mixture of carbon monoxide and nitrogen at 1 atm (partial pressure: CO 0.8 atm, $N_2$ 0.2 atm). The gas mixture was circulated through the overhead space of the absorbing solution by means of a BA-106T air pump (manufactured by Kabushiki Kaisha Iwaki, Japan) during the initial 10 min. absorption period, while the absorbing solution was stirred with a magnetic stirrer. The amount of carbon monoxide absorbed into the absorbing solution was determined at 20° C. according to the gas burette method.

Figure 2:
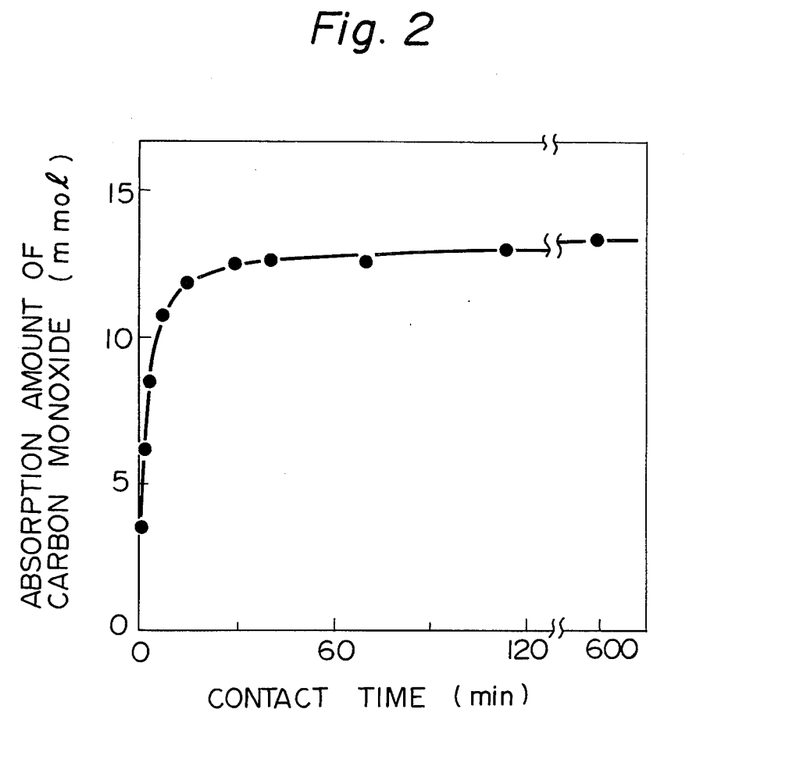
FIG. 2 is a graphical drawing illustrating the correlation between the absorption amount of carbon monoxide and the contact time in Example 8.

As shown in the solid curve of FIG. 2, the carbon monoxide was rapidly absorbed into the absorbing solution. That is, 10.2 mmol of carbon monoxide was absorbed after 3 minutes and 13.9 mmol of carbon monoxide, which was approximately the equibrium absorption amount, was absorbed after 10 hours.

The carbon monoxide absorbed solution in the flask was heated to a temperature of 90° C. under 1 atm, while the spiral condenser provided at the top of the flask was cooled with tap water. The amount of the gas released was measured by means of the gas burette method. The carbon monoxide was rapidly released from the absorbing solution. The amount of carbon monoxide released was 13.9 mmol after 5 minutes.

Five liters of a nitrogen gas containing 32 mg (1.8 mmol) of water (i.e. water content: 8700 ppm) and having a pressure of 1 atm was prepared.

A vessel containing the nitrogen gas prepared above was connected to a 200 ml two-necked eggplant-type flask containing the above-prepared absorbing solution. The nitrogen gas was circulated through the flask by means of a BA-106T air pump (manufactured by Kabushiki Kaisha Iwaki, Japan) at a temperature of 20° C. for 10 minutes, so that the nitrogen gas passed through the overhead space of the absorbing solution which was stirred by means of a magnetic stirrer.

Thereafter, the flask containing the absorbing solution mentioned above was connected to the vessel containing the above-mentioned gas mixture having a pressure of 1 atm (partial pressure: CO 0.8 atm, $N_2$ 0.2 atm). The gas mixture was circulated through the overhead space of the absorbing solution by means of the air pump, while the absorbing solution was stirred at a temperature of 20° C. by means of the magnetic stirrer. The carbon monoxide was rapidly absorbed into the absorbing solution. As shown in the circle points of FIG. 2, no substantial decrease in the carbon monoxide absorption rate and amount of the absorbed carbon monoxide was observed as compared with the absorbing solution prior to contact with the humid gas.

When the carbon monoxide absorbed solution was heated to a temperature of 90° C. under 1 atm, the carbon monoxide was rapidly released from the absorbing solution. The amount of carbon monoxide released was 13.8 mmol after 5 minutes.

EXAMPLE 9

The same procedure as described in Example 8 was used, except that 5 liters of a nitrogen gas containing water under a saturated vapor pressure (i.e. 23100 ppm of water) and having a pressure of 1 atm was used in lieu of the nitrogen gas containing 8700 ppm of water.

Before the absorbing solution was contacted with a nitrogen gas containing 23100 ppm of water, the carbon monoxide gas was absorbed into the absorbing solution by circulating 1 liter of the gas mixture of carbon monoxide and nitrogen having a pressure of 1 atm (partial pressure: CO 0.8 atm, $N_2$ 0.2 atm) through the overhead space of the absorbing solution at a temperature of 20° C., while the absorbing solution was stirred with a magnetic stirrer. The carbon monoxide was rapidly absorbed into the absorbing solution. That is, 13.9 mmol of carbon monoxide, which was approximately the equibrium absorption amount, was absorbed after 10 hours.

The carbon monoxide absorbed solution was heated to a temperature of 90° C. under 1 atm and the amount of the gas released was measured by means of the gas burette method. The carbon monoxide was rapidly released or desorved from the absorbing solution. The amount of carbon monoxide released was 13.7 mmol after 5 minutes.

Then, 5 liters of the nitrogen gas containing 23100 ppm of water and having a pressure of 1 atm was circulated through the overhead space of the absorbing solution in the flask by means of the air pump, while the absorbing solution was stirred at a temperature of 20° C. for 10 minutes with a magnetic stirrer.

Thereafter, 1 liter of the gas mixture of carbon monoxide and nitrogen having a pressure of 1 atm (partial pressure: CO 0.8 atm, $N_2$ 0.2 atm) was circulated through the overhead of the absorbing solution while being stirred at 20° C. with a magnetic stirrer. Thus, carbon monoxide was rapidly absorbed into the absorbing solution. That is, 13.9 mmol of carbon monoxide, which was approximately the equibrium absorption amount, was absorbed after 10 hours. When the resultant absorbing solution was heated to a temperature of 90° C. at 1 atm, the carbon monoxide was rapidly released. The amount of carbon monoxide released was 13.7 mmol after 5 minutes.

EXAMPLE 10

The same procedure as described in Example 8 was used, except that 1.9 of a mixture of polystyrene A-500 ® having a polymerization degree of 2, 3, 4, 5, 6, 7 and 8 (manufactured by Toyo Soda Kabushiki Kaisha), mol % of which were 16, 27, 23, 16, 10, 5 and 3%, respectively) was used in lieu of the polystyrene having a polymerization degree of 1600–1800.

Before the absorbing solution was contacted with a nitrogen gas containing 8700 ppm of water, the carbon monoxide gas was absorbed into the absorbing solution by circulating 1 liter of the gas mixture of carbon monoxide and nitrogen having a pressure of 1 atm (partial pressure: CO 0.8 atm, $N_2$ 0.2 atm) through the overhead space of the absorbing solution at a temperature of 20° C., while the absorbing solution was stirred with a magnetic stirrer. The carbon monoxide was rapidly absorbed into the absorbing solution. That is, 13.9 mmol of carbon monoxide, which was approximately the equibrium absorption amount, was absorbed after 10 hours.

The carbon monoxide absorbed solution was heated to a temperature of 90° C. under 1 atm and the amount of the gas released was measured by means of the gas burette method. The carbon monoxide was rapidly released or desorved from the absorbing solution. The amount of carbon monoxide released was 13.7 mmol after 5 minutes.

Then, 5 liters of the nitrogen gas containing 8700 ppm of water and having a pressure of 1 atm was circulated through the overhead space of the absorbing solution in the flask by means of the air pump, while the absorbing solution was stirred at a temperature of 20° C. for 10 minutes with a magnetic stirrer.

Thereafter, 1 liter of the gas mixture of carbon monoxide and nitrogen having a pressure of 1 atm (partial pressure: CO 0.8 atm, $N_2$ 0.2 atm) was circulated through the overhead of the absorbing solution while being stirred at 20° C. with a magnetic stirrer. Thus, carbon monoxide was rapidly absorbed into the absorbing solution. That is, 13.9 mmol of carbon monoxide, which was approximately the equibrium absorption amount, was absorbed after 10 hours. When the resultant absorbing solution was heated to a temperature of 90° C. at 1 atm, the carbon monoxide was rapidly released. The amount of carbon monoxide released was 13.7 mmol after 5 minutes.

EXAMPLE 11

The same procedure as described in Example 8 was used, except that 2.2 g of Kraton-G-1650 ® [manufactured by Shell Corp., block copolymer of 30 parts of styrene and 70 parts of olefin (ethylene and butene-1) and the diene residue being hydrogenated] was used in lieu of the polystyrene having a polymerization degree of 1600–1800 and 40 ml of toluene was used in lieu of 20 ml of toluene.

Before the absorbing solution was contacted with a nitrogen gas containing 8700 ppm of water, the carbon monoxide gas was absorbed into the absorbing solution by circulating 1 liter of the gas mixture of carbon monoxide and nitrogen having a pressure of 1 atm (partial pressure: CO 0.8 atm, $N_2$ 0.2 atm) through the overhead space of the absorbing solution at a temperature of 20° C., while the absorbing solution was stirred with a magnetic stirrer. The carbon monoxide was rapidly absorbed into the absorbing solution. That is, 12.7 mmol of carbon monoxide, which was approximately the equibrium absorption amount, was absorbed after 10 hours.

The carbon monoxide absorbed solution was heated to a temperature of 90° C. under 1 atm and the amount of the gas released was measured by means of the gas burette method. The carbon monoxide was rapidly released or desorbed from the absorbing solution. The amount of carbon monoxide released was 12.5 mmol after 5 minutes.

Then, 5 liters of the nitrogen gas containing 8700 ppm of water and having a pressure of 1 atm was circulated through the overhead space of the absorbing solution in the flask by means of the air pump, while the absorbing solution was stirred at a temperature of 20° C. for 10 minutes with a magnetic stirrer.

Thereafter, 1 liter of the gas mixture of carbon monoxide and nitrogen having a pressure of 1 atm (partial pressure: CO 0.8 atm, $N_2$ 0.2 atm) was circulated through the overhead of the absorbing solution while being stirred at 20° C. with a magnetic stirrer. Thus, carbon monoxide was rapidly absorbed into the absorbing solution. That is, 12.0 mmol of carbon monoxide, which was approximately the equibrium absorption amount, was absorbed after 10 hours. When the resultant absorbing solution was heated to a temperature of 90° C. at 1 atm, the carbon monoxide was rapidly released. The amount of carbon monoxide released was 11.8 mmol after 5 minutes.

EXAMPLE 12

Five liters of a gas mixture of carbon monoxide and nitrogen containing 32 mg (1.8 mmol, 8700 ppm) of water and having a pressure of 1 atm (partial pressure: CO 0.2 atm, $N_2$ 0.8 atm) was prepared. The absorbing solution was prepared in the same manner as in Example 8.

The carbon monoxide gas was absorbed into the absorbing solution contained in a 200 ml two-necked, eggplant-type flask at 20° C. for 30 minutes by connecting the flask to a vessel containing the gas mixture, while the absorbing solution was stirred with a magnetic stirrer and the gas mixture was circulated through the overhead space of the absorbing solution. After the system was replaced with helium, the resultant absorbing solution in the flask was heated to a temperature of 90° C. under 1 atm, while the spiral condenser provided at the top of the flask was cooled with tap water. The carbon monoxide was rapidly released. The amount of carbon monoxide released was 2.8 mmol. The gas chromatograph analysis of the released gas indicated that the released gas was carbon monoxide and no substantial amount of nitrogen was found. The gas chromatograph analysis was carried out by means of a gas chromatograph type 701 manufactured by Okura Rikagaku Kenkyusho (Japan) under the following conditions.

Filler: molecular sieve 5A obtained from Gaschro Kogyo Kabushiki Kaisha (Japan)
Column length: 2 m
Column temperature: 40° C.
Carrier gas: helium The gas mixture of carbon monoxide and nitrogen containing 8700 ppm of water and having a pressure of 1 atm (partial pressure: CO 0.2 atm, $N_2$ 0.8 atm) was again prepared. The gas mixture was circulated through the overhead space of the absorbing solution for 30 minutes, while the absorbing solution was stirred at 20° C. with a magnetic stirrer. Thus, the carbon monoxide was absorbed into the absorbing solution. When the resultant absorbing solution was heated to a temperature of 90° C. under 1 atm, the carbon monoxide was rapidly released. The amount of carbon monoxide released was 2.8 mmol after 5 minutes.

We claim:

1. A process for separting carbon monoxide from a gas mixture containing 1.0 through 99% by volume carbon monoxide and a water content exceeding 1 ppm but less than the saturated vapor pressure of water, said process comprising a step of contacting the gas mixture with an absorbing solution containing:
   (a) at least one copper (I) chloride or bromide compound,
   (b) at least one aluminum (III) chloride or bromide compound and,
   (c) at least one compound having at least two benzene nuclei per molecule and selected from the group consisting of:
   (A) a compound selected from the group consisting of diphenyl, 2-, 3-, or 4-methyldiphenyl, 2-, 3- or 4-ethyldiphenyl, 3,4-dimethyldiphenyl, 3,5-diethyldiphenyl, 3,3-dimethyldiphenyl, 3,4'-dimethyldiphenyl, 4,4'-dimethyldiphenyl, 3,3'-diethyldiphenyl, 3,4'-diethyldiphenyl, 4,4'-diethyldiphenyl, diphenylmethane, 3 or 4-methyldiphenylmethane, (3,4-dimethylphenyl) phenylmethane, (3,5-dimethylphenyl)phenylmethane, bis(3,methylphenyl)methane, (3-methylphenyl)(4-methylphenylmethane, 3 or 4-ethyldiphenyl)methane, 3,4-diethyl-diphenylmethane, (3,5-diethylphenyl)phenylmethane, bis(3-ethylphenyl) methane, (3-ethylphenyl)(4-ethylphenyl)-methane, 1,1-diphenylethane, 1-(3 or 4-methylphenyl)-1-phenylethane, 1-(3,4-dimethylphenyl)-1-phenylethane, 1-(3,5-dimethylphenyl)-1-phenylethane, 1,1-bis(3 or 4-methylphenyl)ethane, 1-(3 or 4-ethylphenyl)-1-phenylethane, 1-(3,4-diethylphenyl)-1-phenylethane, 1-(3,5-diethylphenyl)-1-phenylethane, 1,1-bis(3 or 4-ethylphenyl)ethane, 1,2-diphenylethane, 1,3-diphenylpropane, 1,4-diphenylbutane or mixtures thereof;
   (B) the oligomers of styrene or the derivatives thereof; and
   (C) the polymers of styrene of the derivatives thereof together with an aromatic solvent; and
   (D) the copolymers of (i) styrene or the derivatives thereof and (ii) ethylene or the derivatives thereof together with an aromatic solvent.

2. A process as claimed in claim 1, wherein the polymerization degree of the oligomers, is 2 through 20.

3. A process as claimed in claim 1, wherein the polymerization degree of the polymers and copolymers is 20 through 10000.

4. A process as claimed in claim 1 wherein the absorbing solution further contains an aromatic solvent.

5. A process as claimed in claim 4, wherein a molar ratio of the aromatic solvent to the copper (I) halide is 0.5 through 30.

6. A process as claimed in claim 1 or 4, wherein a molar ratio of the copper(I) chloride or bromide compound to the aluminum(III) chloride or bromide compound is 0.9 through 3.

7. A process as claimed in claim 1 or 4, wherein a molar ratio of the compound having the general formula (I) to the copper(I) chloride or bromide compound is 0.5 through 50.

8. A process as claimed in claim 14 or 3, wherein a molar ratio of the oligomer, polymer or copolymer, in terms of the aromatic ring residue, to the copper(I) chloride or bromide compound is 1.0 through 100.

9. A process as claimed in claim 1 or 4, wherein the gas mixture was contacted with the absorbing solution at a temperature of 20 through 100° C.

10. A process as claimed in claim 1 or 4, wherein the absorbing solution after contacted with the gas mixture is heated at a temperature of 80 through 200° C., whereby the absorbed carbon monoxide is released from the absorbing solution.

* * * * *